March 27, 1951 S. E. HUFF 2,546,509
TIRE DOLLY
Filed Aug. 4, 1949 2 Sheets-Sheet 1
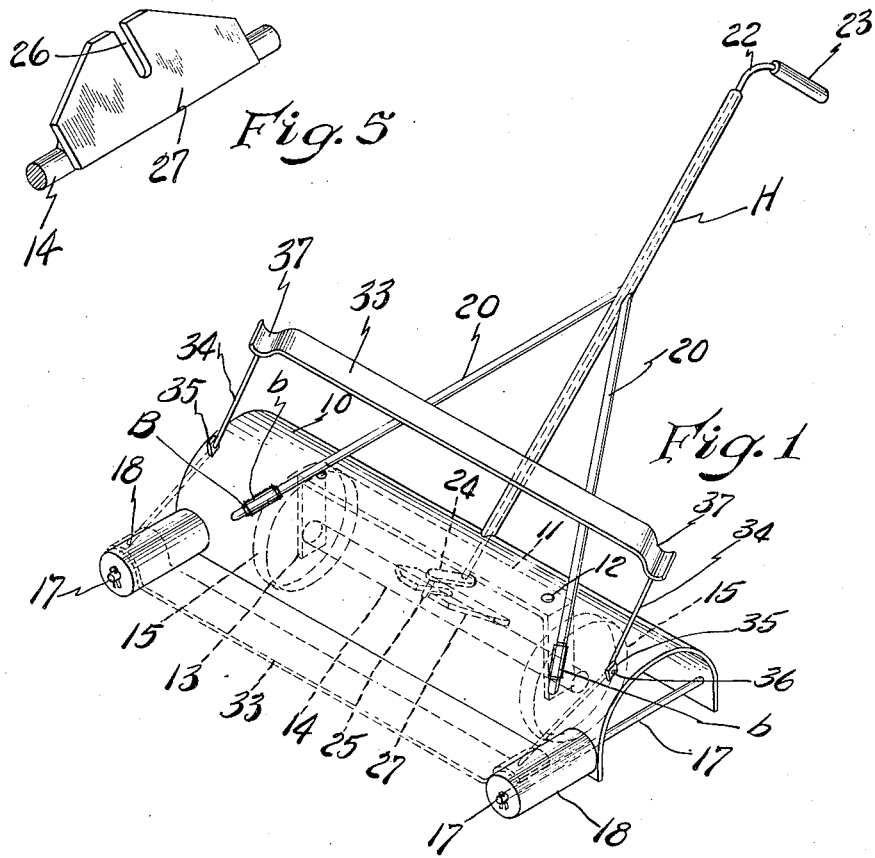
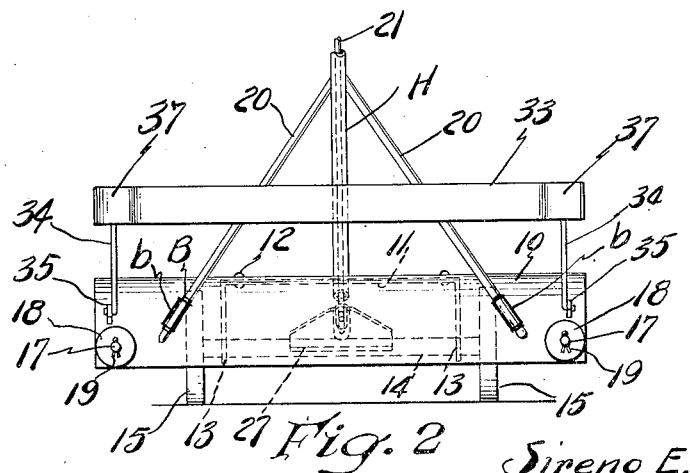
INVENTOR.
Sireno E. Huff
BY Frank C. Karman
ATTORNEY March 27, 1951 S. E. HUFF 2,546,509
TIRE DOLLY Filed Aug. 4, 1949 2 Sheets-Sheet 2

INVENTOR.
Sireno E Huff
BY Frank C. Learman
ATTORNEY

Patented Mar. 27, 1951

2,546,509

UNITED STATES PATENT OFFICE 2,546,509

TIRE DOLLY

Sireno Emmet Huff, Evart, Mich.

Application August 4, 1949, Serial No. 108,577

7 Claims. (Cl. 214—1)

This invention relates to tire dollies, and more particularly to the type employed in transporting the heavy pneumatic tires of trucks, trailers, airplanes, busses and the like. The size and weight of these tire units is such as to make necessary a mobile supporting device for transporting them from one location to another, such as a repair department for repair, and thence back to the vehicle for mounting.

It is further of extreme importance that the tire supporting means be laterally shiftable on the dolly chassis, so that the tire may be easily aligned with the wheel hub and wheel studs, so that the removal and replacement of the wheel can be accomplished by a single workman and without undue strain or effort.

It is therefore the prime object of my invention to provide a tire or wheel dolly of the type described, which in addition to performing the usual functions of conveying the tire unit to and from the place of removal or replacement, also provides for easy vertical and rotary adjustment of the tire unit with respect to the securing means, and further provides easily operable means for aligning the unit longitudinally with relation to a vertical centerline through the hub of the wheel.

A further object of my invention is to provide means whereby the dolly can be easily converted to form a platform on which large and bulky objects other than tires may be easily loaded and transported without sacrificing any of the aforementioned positioning advantages.

Still a further object of my invention is the provision of the dolly which is relatively light in weight but so designed and constructed as to be sturdy and durable enough to handle the large, heavy tire units referred to as well as other heavy objects and articles found in garages and similar places.

A further object still is to provide a simple, practical and substantial dolly which can be easily and economically manufactured and assembled.

Other objects and advantages of my invention will become apparent as the specification progresses, reference being had to the accompanying drawings in which I have shown one embodiment of my invention, it being understood that changes may be made in the form, size and arrangement of the various parts without departing from the spirit of the invention or the scope of the hereto appended claims.

In the drawings:

Fig. 1 is a perspective view of my new dolly.

Fig. 2 is a front-elevational view thereof with the handle broken away.

Fig. 5 is a perspective view of the crank actuated shaft plate.

Figure 3:
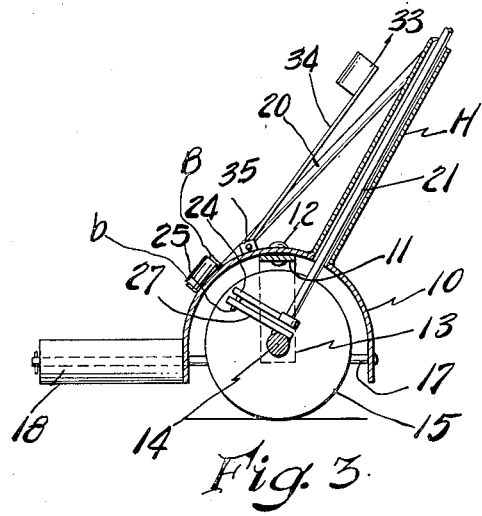
Fig. 3 is a fragmentary, sectional-end elevational view.

When mounting a heavy wheel with tire on car or truck, considerable jockeying is necessary to align the tire unit vertically, longitudinally and circumferentially with respect to the wheel hub and securing studs, all of which can be accomplished with my new dolly.

Referring now more particularly to the accompanying drawings in which I have shown the preferred embodiment of my invention, the numeral 10 indicates a transversely curved housing having a horizontally disposed U-shaped frame 11 secured thereto by means of rivets 12 or the like, the legs 13 of said frame being suitably bored to accommodate an axle 14 on which wheels 15 are journaled as usual, suitable pins 16 being provided on each axle adjacent the wheels for preventing endwise movement of the wheels, but the device is designed to provide for limited lateral movement of the legs with relation to the axle, so that the housing may be laterally shifted and in a manner to be presently described.

Transversely disposed rod members 17 span the housing 10 and are welded or otherwise secured thereto, the front ends of these rods projecting beyond the front wall of the housing, and rollers 18 are journaled thereon, a conventional cotter pin 19 being mounted in the end sections of the rods to secure the rollers in position.

A hollow handle stem H is welded to the housing 10 and projects upwardly at an angle thereto, braces 20 being welded to said stem and to the housing, and small brackets B are welded to the lower end sections of said braces with rollers b journaled in said brackets and against which the tire unit T bears to eliminate friction.

A rod 21 is rotatably mounted in the stem H, the upper end being bent as at 22 and projects at an angle to the bend, with a handle 23 provided on the end as shown. The lower end of the rod extends into the housing 10, and a crank 24 is secured thereon, a depending pin 25 being provided in the free end of the crank and engages a slotted passage 26 provided in a plate 27 which is welded or otherwise secured to the axle 14, and it will be obvious that as the handle 23 is swung, the housing 10 will be shifted laterally on the axle and as indicated in Fig. 4 of the drawings.

Figure 4:
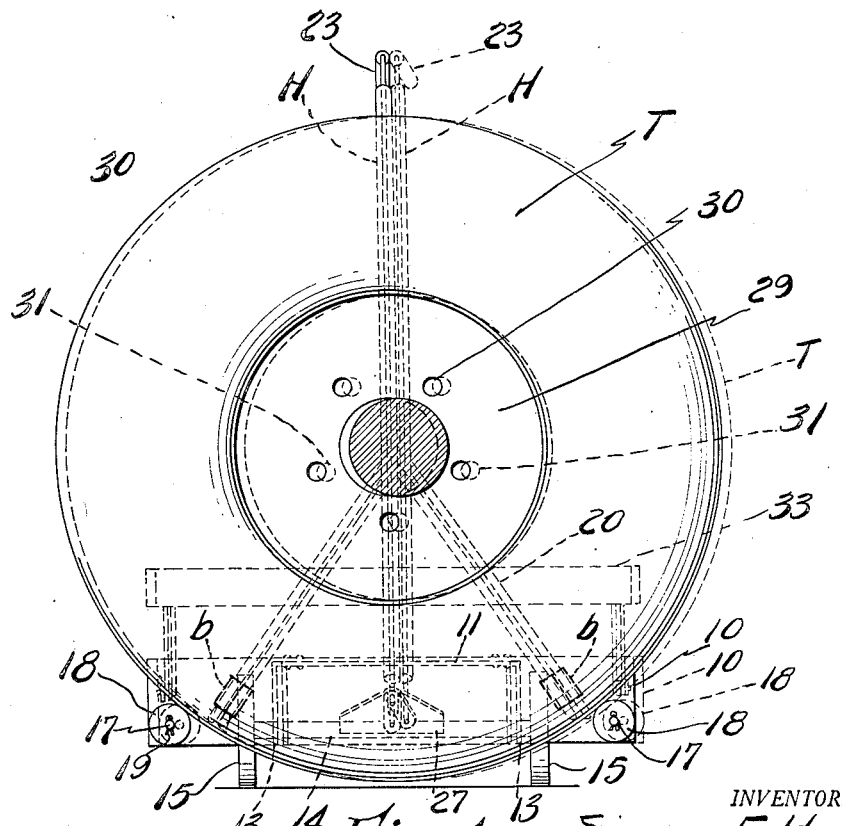
Fig. 4 is a front-elevational view, the solid lines showing a tire in position on the dolly, the broken lines illustrating the longitudinal movement of the tire carrier and housing with relation to the dolly chassis.

Referring now to Fig. 4 of the drawings, the vehicle axle is shown in section as at 28, and the tire unit T is mounted on the dolly. Assuming that it is desired to mount the tire on the wheel 29, and the studs 30 are not in horizontal alignment with the stud openings 31 of the wheel rim 32; under such circumstances it is merely necessary to turn the handle 23 to shift the housing and the tire unit thereon laterally with relation to the dolly chassis which comprises the axle, wheels and axle plate to bring the tire unit into alignment with the hub and studs, and it may be necessary to rotate the tire on the rollers 18 and b, after which the mounting is quick and easy.

A load supporting bar or platform 33 is hingedly mounted on the housing 10 and has arms 34 which are hingedly connected to lugs 35 provided in the housing by means of pins 36, the end sections of the bar 33 being shaped as at 37 to snugly fit the curvature of the rollers 18, and when this bar is swung down to position as indicated in broken lines in Fig. 1 of the drawings, it forms a platform bridging the rollers and on which any desired object or article can be transported.

I wish to direct particular attention to the fact that the housing and rollers are laterally shiftable on the axle and that the axle and wheels form the chassis of the device.

In practice, the device operates in the following manner. The tire and wheel unit T to be secured on the hub 29 of a vehicle is mounted on the rollers 18 and rests against the handle stem and braces H and 20 respectively, all as clearly shown in Fig. 4 of the drawings. In this position, the unit is transported to the vehicle (not shown) on which it is to be mounted.

If the tire rim and stud openings 31 are not in proper alignment with the studs 30, the handle 23 can be swung down to raise the tire unit to proper vertical position, and then rotated to laterally shift the housing and tire unit on the chassis to align the stud accommodating holes in the wheel with the studs on the hub, and the tire unit can also be rotated on the rollers 18 as necessary.

When the device is used for transporting articles and equipment other than tire units, the bar 33 is swung down to position as shown in Fig. 1, and tubs, barrels, boxes and other heavy objects (not shown) can be placed thereon and readily transported from place to place.

From the foregoing description, it will be obvious that I have perfected a very simple, practical and economical all-purpose dolly for transporting and positioning heavy tire units, heavy objects, and equipment of all kinds.

What I claim is:

1. A dolly of the class described comprising a housing, spaced-apart rollers rotatably mounted on said housing member and extending forwardly thereof, a rearwardly and upwardly extending stem rigidly secured to said housing and supported thereby, a handle rotatably mounted in the stem, bearings in said housing, a non-rotatable axle adjustably mounted therein, ground-engaging wheels rotatably journaled on the ends of said axle, and means on said handle and connected to said axle for shifting said housing laterally with relation thereto.

2. The combination as defined in claim 1 in which a supporting bar is hingedly connected to said housing and is shiftable to lowered position to form a load bearing platform.

3. The construction as defined in claim 1 in which a longitudinally disposed supporting bar is hingedly connected to the housing, the end sections of the bar being bowed to intimately engage the cylindrical surface of the rollers.

4. The combination defined in claim 1 in which the shifting means comprises a slotted plate solid on the axle, and a crank on the handle and engageable with said slotted plate for lateral shifting movement of the housing with relation to the wheels when the handle is swung.

5. In combination, a tire dolly comprising a semi-circular housing, spaced-apart horizontally-disposed cross rods mounted in said housing, the end sections of which extend forwardly thereof, rollers rotatably mounted on the forwardly extending sections of said cross rods, a stem rigidly affixed to the upper side of said housing and extending upwardly and rearwardly therefrom, a longitudinally disposed frame rigidly secured to the underside of said housing and formed with downwardly depending bored legs, a non-rotatable axle mounted in said bores and ground-engaging wheels rotatably mounted on the ends of said axle, and a handle rotatably mounted in said stem and engageable with said axle for shifting said housing on the axle.

6. In combination, a tire dolly comprising a semi-circular housing, spaced-apart horizontally disposed cross rods mounted in said housing and extending forwardly therefrom, rollers mounted on the forwardly extending sections of said cross rods, a centrally disposed stem rigidly affixed to the upper side of said housing and extending upwardly and rearwardly therefrom, a longitudinally disposed frame rigidly secured in said housing and formed with downwardly depending bored legs, a non-rotatable axle mounted in said bored legs, ground-engaging wheels rotatably mounted on the ends of said axle, a slotted plate provided on the axle, a handle rotatably mounted in the stem, and a crank on the lower end of said handle and engageable with the slotted plate for shifting said housing when the handle is actuated.

7. In combination, a tire dolly comprising a semi-circular housing, spaced-apart horizontally disposed cross rods mounted in and projecting outwardly from said housing, rollers mounted on said cross rods, a stem rigidly affixed to the upper side of the housing and extending upwardly and rearwardly therefrom, a longitudinally disposed frame rigidly secured to the underside of the housing and formed with downwardly depending bored legs, a non-rotatable axle mounted in said bored legs, ground-engaging wheels rotatably mounted on the ends of said axle, angularly disposed braces connected to the housing and the stem respectively, anti-friction means mounted on said braces, and a handle rotatably mounted in said stem and engageable with said axle for shifting said housing thereon.

SIRENO EMMET HUFF.

No references cited.